Jan. 13, 1953     T. A. FLANIGAN     2,625,271
FILTER

Filed Aug. 30, 1950     2 SHEETS—SHEET 1

*INVENTOR.*
THOMAS A. FLANIGAN
BY
*Wallace and Cannon*

ATTORNEYS

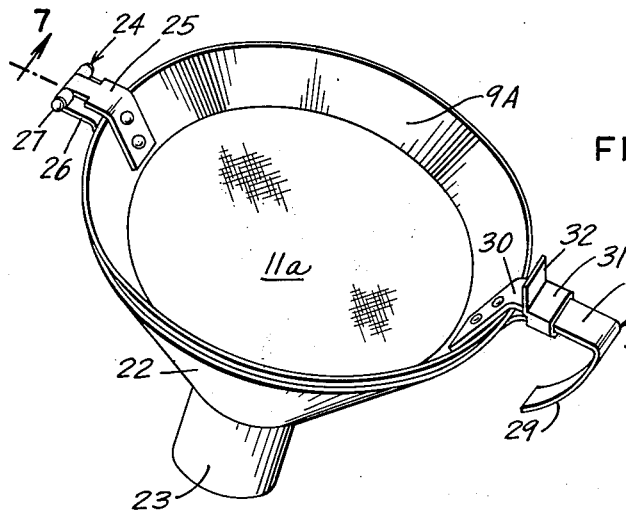
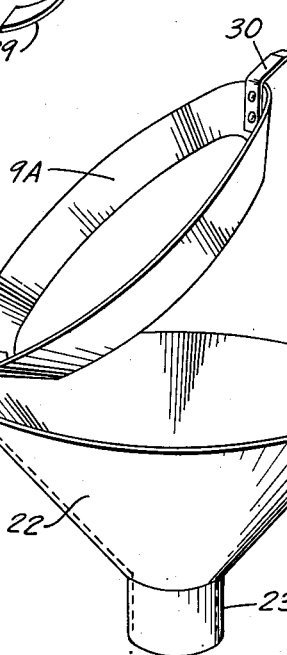
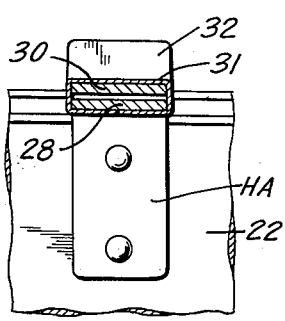
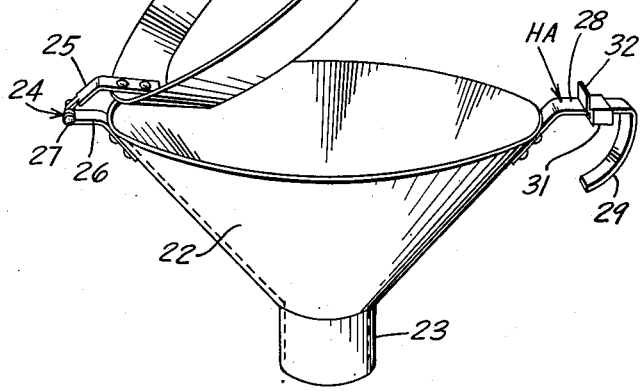

Patented Jan. 13, 1953

2,625,271

UNITED STATES PATENT OFFICE 2,625,271

FILTER

Thomas A. Flanigan, Oak Park, Ill., assignor to John J. Flanigan, Oak Park, Ill.

Application August 30, 1950, Serial No. 182,270

1 Claim. (Cl. 210—159)

This invention relates to filters and more particularly to those embodying a releasable filtering member.

While filters embodying releasable filtering members have been proposed heretofore, these have been such that rather serious objections thereto have been encountered and as a result such filters have not gone into general use. The prior filters of the aforesaid nature have included elements between which a filtering member could be releasably secured, but such elements had not been secured together so that one or the other of the members could easily be misplaced or lost. Therefore, one of the objects of the present invention is to interconnect the elements of a filter between which a filtering member is to be secured so as to thereby avoid misplacement or loss of one or the other of such elements.

The elements of a filter between which a filtering member is to be secured need to be interconnected for relative movement and to enable this to be utilized in a novel, economical and efficient manner, is another object of this invention.

It is also necessary to releasably secure the aforesaid elements of a filter in filtering member retaining position so that the filtering element may be replaced when it is desired and to enable this to be effective in a novel, efficient and economical manner, is yet another object of the present invention. An object ancillary to the foregoing is to mount a retaining member for slidable movement on the handle of the filter and to so arrange the same that it may be readily moved to and from retaining position.

Other and further objects of the present invention will be apparent from the following description and claim and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claim.

In the drawings:

Fig. 5 is a perspective view of another form of my novel filter and wherein the same is embodied in a funnel;

Fig. 6 is a perspective view of the filter shown in Fig. 5 and wherein the filtering member securing elements are depicted in separated relation;

Fig. 7 is a sectional view taken substantially on the line 7—7 on Fig. 5; and

Fig. 8 is a sectional view taken substantially on the line 8—8 on Fig. 7.

Figure 1:
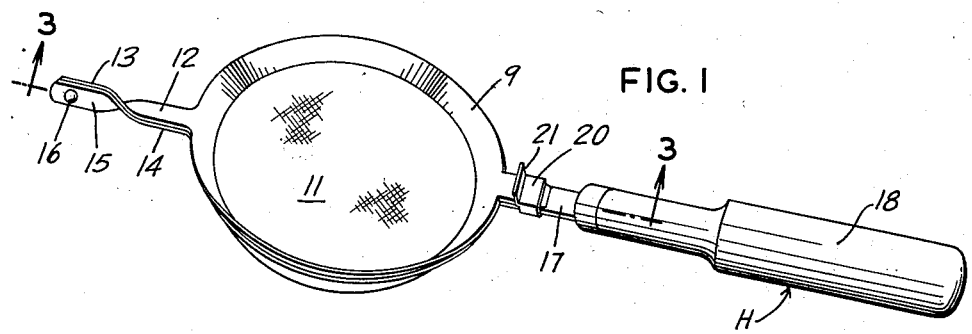
Fig. 1 is a perspective view of one form of the novel filter of my invention.
Figure 2:
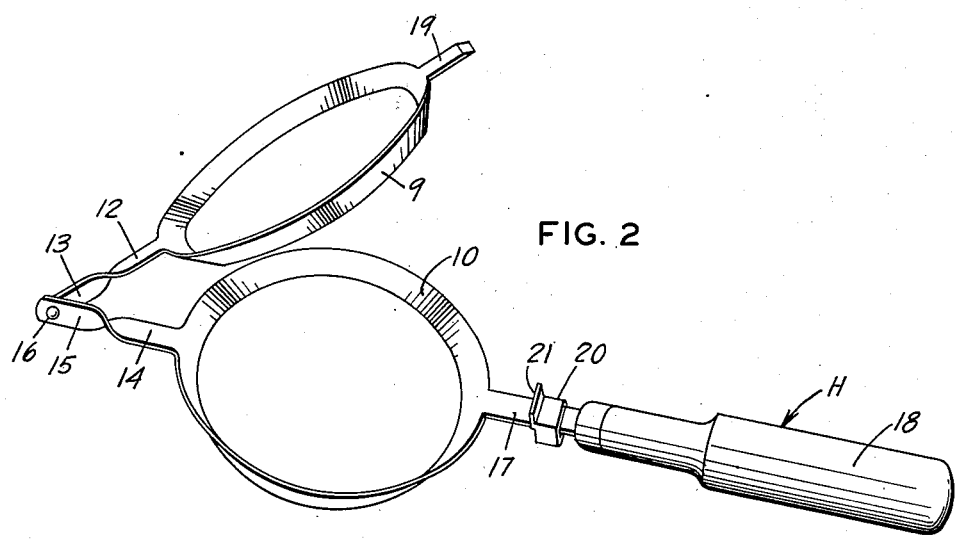
Fig. 2 is a perspective view of the filter shown in Fig. 1 and wherein the filtering member securing elements are depicted in separated relation.
Figure 3:
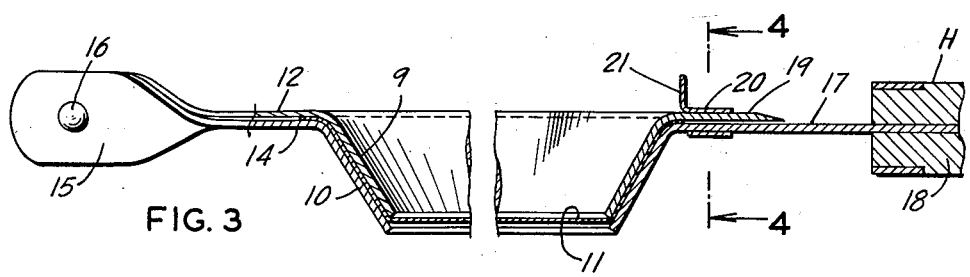
Fig. 3 is a longitudinal sectional view taken substantially on the line 3—3 on Fig. 1.
Figure 4:
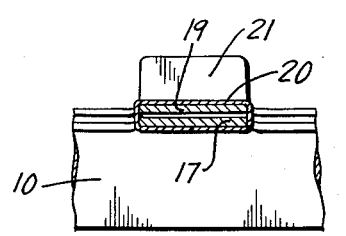
Fig. 4 is a transverse sectional view taken substantially on the line 4—4 on Fig. 3.

The form of my novel filter shown in Figs. 1 to 4, inclusive, of the accompanying drawings is one adapted for general use and one which embodies two frusto-conical filtering member securing elements 9 and 10, which are so related to each other in size and configuration that the member 9 may be nested in the member 10 with a slight space between the two members. The filtering member 11 of this form of my invention is in the form of a disc of paper, cloth, felt or other suitable filtering material and, as best shown in Fig. 3, when the filtering element is to be disposed in operative position, the margin thereof is disposed on the frusto-conical member 10 and thereafter the frusto-conical member 9 is seated on such marginal portion and, inasmuch as the members 9 and 10 may be fixedly retained in this relationship, the filtering member 11 is clamped thereby in its position of use.

The filtering element 9 includes an extension 12 which extends from the member 9 in parallel relation with the edges of this frusto-conical member. Midway in the extent of the member 12 it is folded upon itself so that the end portion 13 thereof is disposed in right angular relationship with part of the extension 12 connected to the member 9. An extension 14 extends from the frusto-conical member 10 in the same manner as the extension 12 extends from the member 9. The free end portion 15 of the extension 14 is disposed in right angular relationship with portion of the extension connected to the member 10. As best shown in Fig. 1, free end portions 13 and 15 are adapted to be disposed in contacting side-by-side relation. A pin 16 is passed through the end portions 14 and 15 and the ends thereof are peened over so as to pivotally interconnect the frusto-conical members 9 and 10, such members being pivotal about the pin 16 as shown in Fig. 2.

When a filtering element 11 has been disposed between the members 9 and 10 and it is desired to secure the same in its position of use, the releasable retaining arrangement of my novel filter is disposed in retaining position. The retaining arrangement of the present invention is associated with the handle H of my novel filter which includes an extension 17 that extends from the frusto-conical member 10 in diametrical relation with the extension 14, and the extension 17 is embedded in the grip portion 18 of the handle H, as shown in Fig. 3. A relatively short extension 19 extends from the member 9 in diametrical relation with the extension 12, and when the frusto-conical members 9 and 10 are arranged in filtering member retaining position, the extention 19 lies in close proximity to the inner portion of the extension 17. A retaining ring 20 including a grip portion 21 is mounted for slidable movement along the extension 17, and when it is passed over the free end of the extension 19, it is effective to releasably secure the members 9 and 10 in filtering member retaining position. When the filtering member 11 is to be replaced, the retaining ring 20 is slid along the extension 17 to be clear of the free end of the extension 19 and thereafter the elements 9 and 10 may be separated one from the other, as shown in Fig. 2.

In the form of my filter shown in Figs. 5 to 8, inclusive, a frusto-conical member 9A, similar to the member 9, is provided and is adapted to nest in the upper marginal portion of a funnel body 22 so that the upper portion of this funnel body serves the function of the frusto-conical member 10. At the smaller end of the frusto-conical funnel member 22 a discharge spout 23 is provided. A filtering element 11A, similar to the filtering element 11, has the margin of the disc shape formation thereof disposed inwardly of the upper marginal portion of the body 22 and thereafter the member 9A is disposed above this marginal portion. Members 9A and 22 are adapted to be releasably secured together and when so secured, they are effective to retain the filtering member 11A in its position of use.

The members 9A and 22 are interconnected by a hinge generally indicated by 24, which includes a leaf 25 that is riveted or otherwise suitably secured to the member 9A. The hinge also includes a leaf 26 that is riveted or otherwise suitably secured to the member 22. A pintle 27 interconnects the leaves 25 and 26, and when it is desired to separate the member 9A from the member 22, as for example, in the manner shown in Fig. 9, the parts are pivoted about the pintle 27.

A handle HA is riveted or otherwise suitably secured to the upper marginal portion of the body 22 in diametrical relation with the leaf 26. This handle includes a flat intermediate portion 28 that is disposed to lie in a plane parallel with the planes in which the edges of the frusto-conical member 9A are disposed. The flat portion 28 terminates in a downwardly and inwardly extending finger portion 29. An extension 30 is riveted or otherwise suitably secured to the member 9A in diametrical relation with the leaf 25, and when the member 9A is nested in the member 22 in the manner shown in Figs. 5 and 7, the extension 30 extends in parallel relation with and along the inward part of the intermediate portion 28 of the handle HA. A retaining ring 31 having a finger or grip portion 32 is slidably mounted on the intermediate portion 28, and when the extension 30 is disposed in parallel relation with the intermediate portion 28, this portion and the marginal portion at the free end of the extension 30 are secured in connected relation, as shown in Figs. 5 and 7. When it is desired to replace the filtering member 11A, the ring 31 is slid along the portion 28 until it is free of the end of the extension 30 and thereupon the filtering member retaining elements may be pivotally separated one from the other, as shown in Fig. 6.

It will be manifest from the foregoing description that the hereinabove described embodiments of my invention enable the above set forth and kindred objects of my invention to be realized. Moreover, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claim.

I claim:

A filter comprising a pair of nested upper and lower downwardly tapered circular clamping elements fitting snugly one within the other and adapted to clamp marginal portions of a sheet of filtering material between them, horizontal strips integral with and extending radially from said clamping elements one above the other and in spaced relation to their inner and outer ends being twisted transversely and thereby disposing their outer end portions horizontally in a vertical plane in side by side relation to each other, a pin passing horizontally through the outer ends of said strips and pivotally connecting the strips for vertical swinging movement of the upper clamping element into and out of a clamping position within the lower clamping element, a handle having a flat horizontal shank integral with and extending radially from the lower clamping element at a point diametrically opposite its strip, a flat tongue integral with and extending radially from the upper clamping element diametrically opposite its strip and resting flat upon said shank when the upper clamping element is in its lower position, and a latching ring fitting loosely about and slidable along the shank into and out of position to extend across the tongue and releasably secure the upper clamping member in its clamping position, said ring being rectangular and thereby held against turning movement about the shank and at its front end carrying an upwardly projecting tongue engageable by a finger of a hand grasping the handle for shifting the ring along the shank.

THOMAS A. FLANIGAN.

REFERENCES CITED

The following references are of record in the file of this patent:

UNITED STATES PATENTS

| Number | Name | Date |
|---|---|---|
| 682,515 | Allard | Sept. 10, 1901 |
| 753,939 | Viner | Mar. 8, 1904 |
| 915,055 | Hunt | Mar. 9, 1909 |
| 1,231,356 | Houge | June 26, 1917 |
| 1,262,680 | Lawrence | Apr. 16, 1918 |
| 2,250,646 | Metsch | July 29, 1941 |

FOREIGN PATENTS

| Number | Country | Date |
|---|---|---|
| 346,063 | France | Nov. 11, 1904 |